US011325718B2

(12) United States Patent
Berry et al.

(10) Patent No.: US 11,325,718 B2
(45) Date of Patent: May 10, 2022

(54) AIRCRAFT PROPULSION SYSTEM ASSEMBLY INCLUDING ONE OR MORE ACOUSTIC PANELS

(71) Applicant: Rohr, Inc., Chula Vista, CA (US)

(72) Inventors: Jacquelyn Berry, Corona, CA (US); Song Chiou, Irvine, CA (US); Jeffrey A. Anderson, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 813 days.

(21) Appl. No.: 15/968,794

(22) Filed: May 2, 2018

(65) Prior Publication Data
US 2019/0337632 A1 Nov. 7, 2019

(51) Int. Cl.
| | |
|---|---|
| *F02K 1/34* | (2006.01) |
| *F02K 1/82* | (2006.01) |
| *F04D 29/66* | (2006.01) |
| *G10K 11/168* | (2006.01) |
| *F02K 1/54* | (2006.01) |

(52) U.S. Cl.
CPC ............. *B64D 33/06* (2013.01); *F02K 1/827* (2013.01); *F04D 29/665* (2013.01); *G10K 11/168* (2013.01); *F02K 1/54* (2013.01); *F05D 2220/323* (2013.01); *F05D 2260/96* (2013.01)

(58) Field of Classification Search
CPC . B64D 33/06; F02K 1/827; F02K 1/54; F04D 29/665; G10K 11/168; F05D 2260/96; F05D 2220/323
USPC ........................................................ 181/292
See application file for complete search history.

(56) References Cited

U.S. PATENT DOCUMENTS

| | | | | |
|---|---|---|---|---|
| 4,091,892 A | * | 5/1978 | Hehmann | F02K 1/827 181/286 |
| 5,912,442 A | * | 6/1999 | Nye | G10K 11/172 181/286 |
| 5,997,985 A | * | 12/1999 | Clarke | B32B 3/12 428/116 |

(Continued)

FOREIGN PATENT DOCUMENTS

| | | | |
|---|---|---|---|
| GB | 2391059 | 1/2004 | |
| WO | WO-2014197035 A2 * | 12/2014 | ............. F01D 25/24 |

OTHER PUBLICATIONS

EP search report for EP19172107.5 dated Sep. 26, 2019.

(Continued)

*Primary Examiner* — Forrest M Phillips
(74) *Attorney, Agent, or Firm* — Getz Balich LLC

(57) ABSTRACT

An assembly is provided for an aircraft propulsion system. This assembly includes a first acoustic panel and a second acoustic panel. The first acoustic panel includes a first perforated skin, a first non-perforated skin and a first cellular core arranged between and connected to the first perforated skin and the first non-perforated skin. The first perforated skin is configured with a plurality of first perforations. A first of the first perforations has a first width. A second acoustic panel includes a second perforated skin, a second non-perforated skin and a second cellular core arranged between and connected to the second perforated skin and the second non-perforated skin. The second perforated skin is configured with a plurality of second perforations. A first of the second perforations has a second width that is smaller than the first width.

20 Claims, 3 Drawing Sheets

(56) References Cited

U.S. PATENT DOCUMENTS

| | | | | |
|---|---|---|---|---|
| 6,352,134 | B1* | 3/2002 | Wang | E01F 8/0023 |
| | | | | 181/292 |
| 6,977,109 | B1* | 12/2005 | Wood | G10K 11/16 |
| | | | | 181/292 |
| 7,963,362 | B2* | 6/2011 | Lidoine | F02C 7/24 |
| | | | | 181/214 |
| 8,579,225 | B2* | 11/2013 | Mardjono | F02C 7/24 |
| | | | | 244/1 N |
| 8,820,477 | B1* | 9/2014 | Herrera | G10K 11/168 |
| | | | | 181/292 |
| 8,863,893 | B2* | 10/2014 | Sternberger | B64D 33/02 |
| | | | | 181/214 |
| 9,514,734 | B1 | 12/2016 | Jones | |
| 9,592,918 | B2 | 3/2017 | Yu et al. | |
| 2006/0024154 | A1 | 2/2006 | Costa | |
| 2009/0173572 | A1* | 7/2009 | Grenzing | G10K 11/172 |
| | | | | 181/292 |
| 2013/0142624 | A1 | 6/2013 | Julliard | |
| 2015/0369127 | A1 | 12/2015 | Gilson | |
| 2016/0215700 | A1 | 7/2016 | Yu | |

OTHER PUBLICATIONS

Mardjono et al. "The EPSL Static Tests Demonstration of Liners Noise Reduction Concepts", 19th AIAA/CEAS Aeroacoustics Conference, May 2013.

Yu et al. "Quiet Technology Demonstrator 2 Intake Liner Design and Validation", American Institute of Aeronautics and Astronautics, Nov. 11, 2012.

* cited by examiner

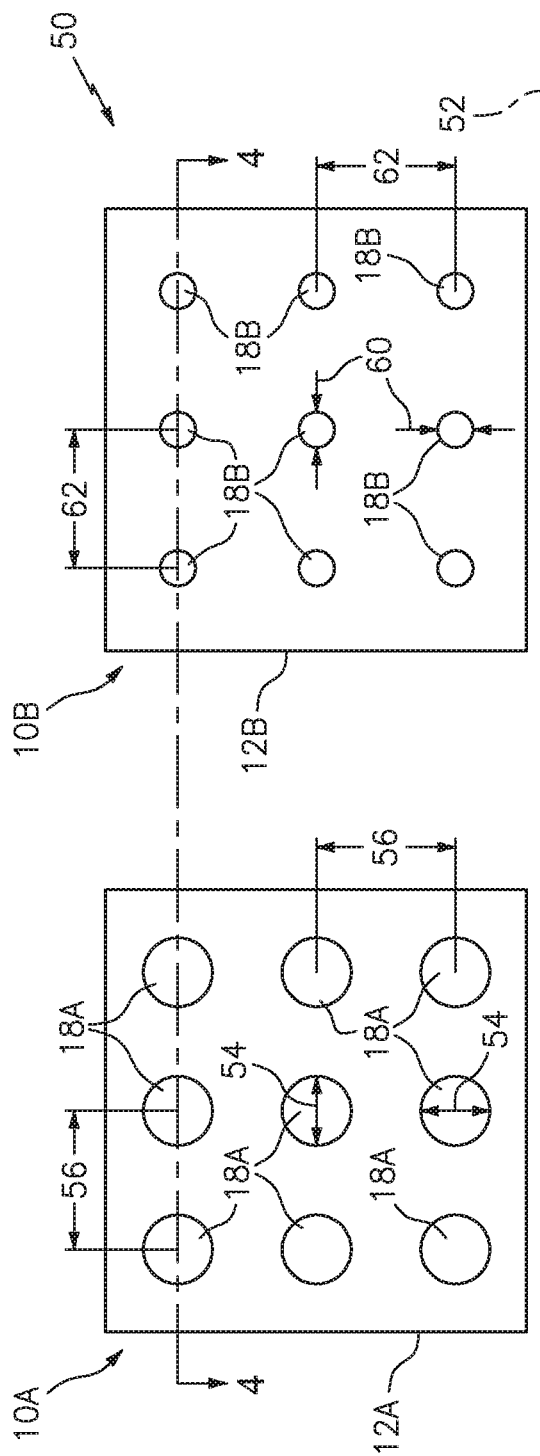
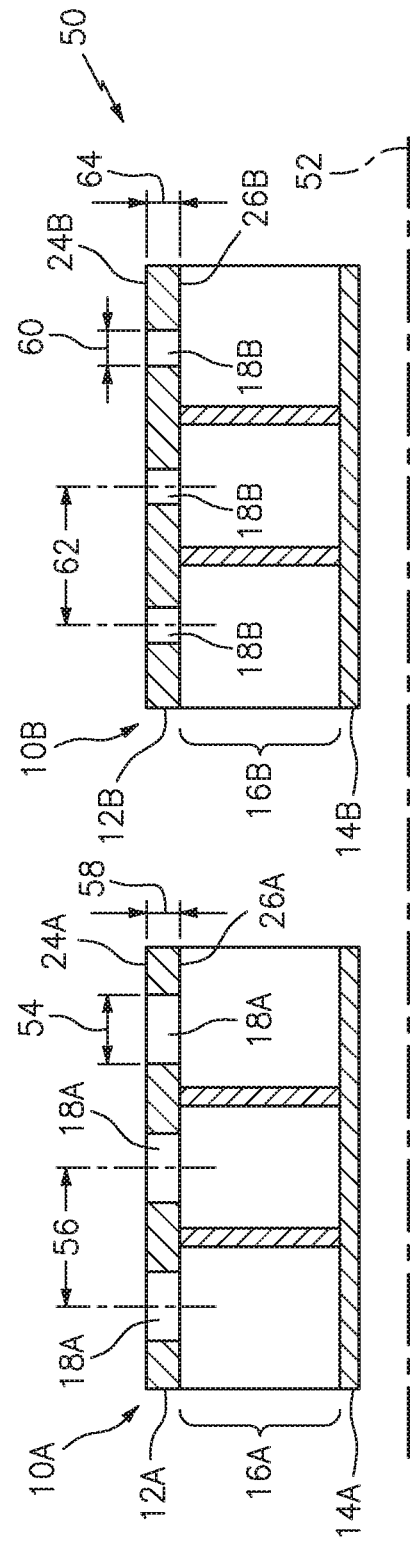
FIG. 3
FIG. 4

AIRCRAFT PROPULSION SYSTEM ASSEMBLY INCLUDING ONE OR MORE ACOUSTIC PANELS

BACKGROUND

1. Technical Field

This disclosure relates generally to an aircraft propulsion system and, more particularly, to an acoustic panel and assemblies including acoustic panels for an aircraft propulsion system.

2. Background Information

An aircraft propulsion system may include one or more acoustic panels for attenuating sound generated by its gas turbine engine. Various types and configurations of acoustic panels are known in the art. While these known acoustic panels have various benefits, there is still room in the art for improvement.

SUMMARY OF THE DISCLOSURE

According to an aspect of the present disclosure, an assembly is provided for an aircraft propulsion system. This assembly includes a first acoustic panel and a second acoustic panel. The first acoustic panel includes a first perforated skin, a first non-perforated skin and a first cellular core arranged between and connected to the first perforated skin and the first non-perforated skin. The first perforated skin is configured with a plurality of first perforations. A first of the first perforations has a first width. The second acoustic panel includes a second perforated skin, a second non-perforated skin and a second cellular core arranged between and connected to the second perforated skin and the second non-perforated skin. The second perforated skin is configured with a plurality of second perforations. A first of the second perforations has a second width that is smaller than the first width.

According to another aspect of the present disclosure, another assembly is provided for an aircraft propulsion system. This system includes an acoustic panel, which including a perforated skin, a non-perforated skin and a cellular core arranged between and connected to the perforated skin and the non-perforated skin. The cellular core is configured with a plurality of cavities. The perforated skin is configured with a plurality of perforations fluidly coupled with the cavities. Each of the perforations has a width that is at least substantially equal to or less than 0.03 inches.

Each of the first perforations may have the first width. Each of the second perforations may have the second width.

An adjacent pair of the first perforations may be separated by a first distance. An adjacent pair of the second perforations may be separated by a second distance that is greater than the first distance.

The first perforated skin may have a first thickness. The second perforated skin may have a second thickness that is less than the first thickness.

The first perforated skin may have a first structural strength. The second perforated skin may have a second structural strength that is greater than the first structural strength.

The first perforated skin may have a first percentage of open area. The second perforated skin may have a second percentage of open area that is less than the first percentage of open area.

The first acoustic panel may be located forward of the second acoustic panel along an axial centerline of the aircraft propulsion system.

The assembly may also include an inner barrel of a nacelle for the aircraft propulsion system. The inner barrel may be configured as or otherwise include the first acoustic panel.

The assembly may also include an inner fixed structure of a nacelle for the aircraft propulsion system. The inner fixed structure may be configured as or otherwise include the second acoustic panel.

The assembly may also include a thrust reverser of a nacelle for the aircraft propulsion system. The thrust reverser may be configured as or otherwise include the second acoustic panel.

The second width may be at least substantially equal to or less than 0.025 inches.

The second width may be at least substantially equal to or less than 0.015 inches.

The first width may be at least substantially equal to or greater than 0.04 inches.

Each of the perforations may have a width that is at least substantially equal to or less than 0.02 inches.

An adjacent pair of the perforations may be separated by a distance at least substantially equal to or greater than 0.04 inches.

The perforated skin may be configured with a percentage of open area that is at least substantially equal to or less than ten.

The assembly may include component of a nacelle for arranging aft of a fan section of the aircraft propulsion system. The component may be configured as or otherwise include the acoustic panel.

The assembly may include an inner fixed structure of a nacelle for the aircraft propulsion system. The inner fixed structure may be configured as or otherwise include the acoustic panel.

The assembly may include a thrust reverser for the aircraft propulsion system. The thrust reverser may be configured as or otherwise include the acoustic panel.

The foregoing features and the operation of the invention will become more apparent in light of the following description and the accompanying drawings.

BRIEF DESCRIPTION OF THE DRAWINGS

FIG. 3 is a schematic illustration of an assembly for the aircraft propulsion system, in accordance with various embodiments; and FIG. 4 is a sectional schematic illustration of the assembly of FIG. 3, in accordance with various embodiments.

DETAILED DESCRIPTION

Figure 1:
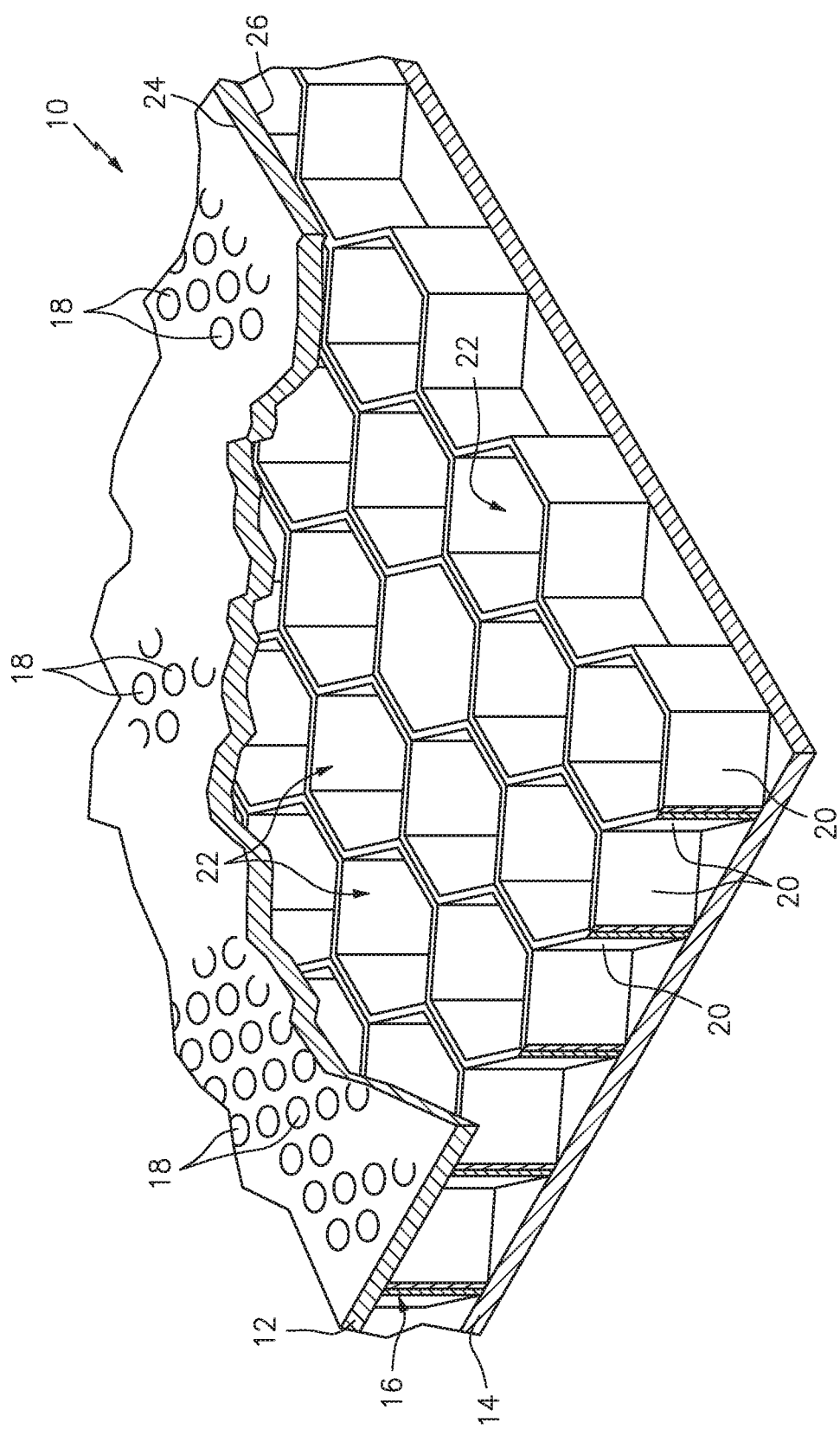
FIG. 1 is a perspective cutaway illustration of a portion of an acoustic panel for an aircraft propulsion system, in accordance with various embodiments.

FIG. 1 is a perspective cutaway illustration of a portion of an exemplary acoustic panel 10 (e.g., a sound attenuating panel) for an aircraft propulsion system. Examples of such an aircraft propulsion system include, but are not limited to, a turbofan propulsion system and a turbojet propulsion system.

The acoustic panel 10 of FIG. 1 is configured to attenuate sound (e.g., noise) generated by the aircraft propulsion system. This acoustic panel 10 includes a perforated skin 12, a solid/non-perforated skin 14 and a cellular core 16.

The perforated skin 12 may be configured as a relatively thin sheet or layer of material. This perforated skin material may be, but is not limited to, metal or composite material such as fiber-reinforcement (e.g., fiberglass fibers, carbon fibers and/or aramid (Kevlar®) fibers) within a thermoplastic or thermoset resin matrix. The perforated skin 12 of FIG. 1 includes a plurality of perforations 18; e.g., apertures such as through-holes. Each of these perforations 18 extends through the perforated skin 12.

The non-perforated skin 14 may be configured as a relatively thin sheet or layer of (e.g., continuous and uninterrupted) material. This non-perforated skin material may be, but is not limited to, metal or composite material such as fiber-reinforcement (e.g., fiberglass fibers, carbon fibers and/or aramid (Kevlar®) fibers) within a thermoplastic or thermoset resin matrix. The non-perforated skin material may be the same as or different than the perforated skin material.

The cellular core 16 is arranged vertically (e.g., radially) between and is connected to the perforated skin 12 and the non-perforated skin 14. The cellular core 16, for example, may be welded, brazed, diffusion bonded, fused, adhered and/or otherwise bonded (directly or indirectly) to the perforated skin 12 and the non-perforated skin 14.

The cellular core 16 is configured as an open cell porous structure. The cellular core 16 of FIG. 1, for example, has a honeycomb configuration formed by a plurality of side-by-side corrugated walls 20. With such a configuration, the cellular core 16 includes a plurality of cavities 22 laterally between the walls 20. Each of these cavities 22 extends through the cellular core 16 between the perforated skin 12 and the non-perforated skin 14. Each of the cavities 22 is fluidly coupled with one or more of the perforations 18 in the perforated skin 12. The present disclosure, however, is not limited to such an exemplary core configuration. The cellular core 16, for example, may be configured with a so-called N-core configuration, an example of which is described in U.S. Pat. No. 9,592,918 to Yu et al., or any other structural panel core configuration.

The core material may be, but is not limited to, metal or composite material such as fiber-reinforcement (e.g., fiberglass fibers, carbon fibers and/or aramid (Kevlar®) fibers) within a thermoplastic or thermoset resin matrix. The core material may be the same as or different than the perforated skin material and/or the non-perforated skin material.

Each cavity 22 of the acoustic panel 10, which is fluidly coupled with one or more of the perforations 18 in the perforated skin 12, may form a resonance chamber. During aircraft propulsion system operation, each resonance chamber may receive sound (e.g., noise) waves through respective perforation(s) 18 in the perforated skin 12. The resonance chamber may reverse the phase of one or more frequencies of those sound waves using known acoustic reflection principles and subsequently direct the reverse phase sound waves out of the acoustic panel 10 through the respective perforation(s) 18 to destructively interfere with other incoming sound waves.

In addition to attenuating sound, the acoustic panel 10 may also affect fluid flow (e.g., airflow) through the aircraft propulsion system. For example, the perforations 18 in the perforated skin 12 may affect flow resistance to (e.g., drag against) boundary layer air flowing along the acoustic panel 10 and, more particularly, the perforated skin 12. Increased flow resistance may lead to decreased propulsion system efficiency, particularly where the fluid flowing along the perforated skin 12 has a relatively high velocity; e.g., Mach number.

The inventors of the present disclosure have discovered parameters associated with the perforations 18 in the perforated skin 12 can affect not only the capability of the acoustic panel 10 to attenuate sound, but also aerodynamic and structural characteristics of the acoustic panel 10. For example, reducing a size (e.g., a lateral width) of the perforations 18 in the perforated skin 12 may decrease the flow resistance to the boundary layer air flowing along the perforated skin 12. Reducing the perforation size, while maintaining the same acoustic performance for example, provides the perforated skin 12 with a lower percentage of open area (POA). The term "percentage of open area" may describe a percentage of a surface area of an element, here an exterior surface 24 of the perforated skin 12, that is occupied by open area; i.e., voids from the perforations 18. Reducing the percentage of open area of the perforated skin 12 may increase the structural strength of the perforated skin 12. Provision of increased structural strength enables a vertical thickness of the perforated skin 12 between its opposing surfaces 24 and 26 to be decreased, which reduces the mass and weight of the perforated skin 12 and, thus, the entire acoustic panel 10.

The inventors of the present disclosure have further discovered sound attenuation may be maintained or increased, particularly in environments with relatively high fluid velocities, by decreasing the perforation size in conjunction with reducing the percentage of open area of the perforated skin 12. Such environments, referring now to FIG. 2, include those forming a bypass duct 28 of the propulsion system 30 downstream of a fan section 32 of the propulsion system 30. In these environments, an acoustic panel such as the acoustic panel 10 of FIG. 1 may be configured as or included as part of an inner fixed structure (IFS) component or a thrust reverser (TR) component. Examples of an IFS component include, but are not limited to, a bifurcation wall 34, an outer barrel 36 and an exhaust nozzle 38. Examples of a TR component include, but are not limited to, a blocker door 40 and an interior portion 42 of a translating sleeve. However, in other environments such as those axially aligned with or forward of the fan section 32 with relatively low fluid velocities, it may be advantageous to configure the acoustic panel with a larger perforation size and larger percentage of open area of the perforated skin 12. In such environments, an acoustic panel such as the acoustic panel 10 of FIG. 1 may be configured as or included as part of an inner barrel 44 of a nacelle inlet structure 46 or a fan duct acoustic liner 48.

Figure 2:
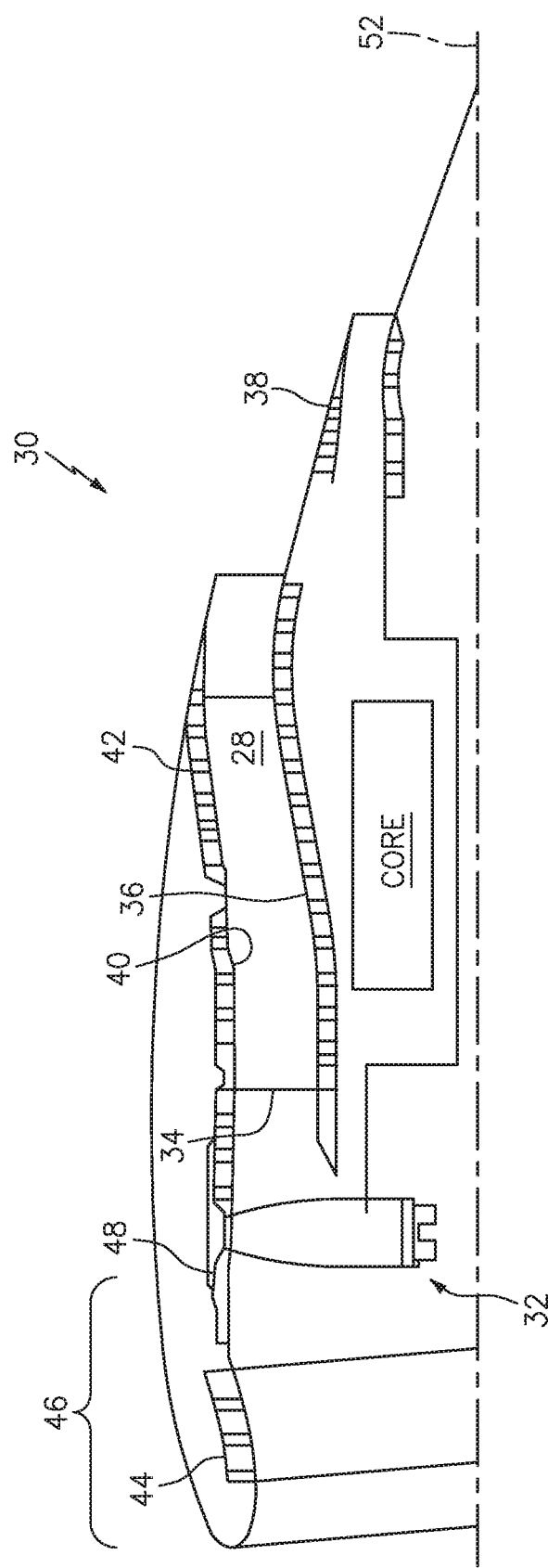
FIG. 2 is a schematic illustration of a portion of the aircraft propulsion system, in accordance with various embodiments.

FIG. 3 is a schematic illustration of an assembly 50 for an aircraft propulsion system such as the propulsion system of FIG. 2. This assembly 50 includes at least a first (e.g., forward, upstream) acoustic panel 10A and a second (e.g., aft, downstream) acoustic panel 10B. The first acoustic panel 10A is arranged forward and/or upstream of the second acoustic panel 10B along an axial centerline 52 of the propulsion system 30. The first acoustic panel 10A is configured in the forward, upstream environment of the aircraft propulsion system, whereas the second acoustic panel 10B is configured in the aft, downstream environment of the aircraft propulsion system. The first acoustic panel 10A may be configured as or otherwise included as part of, for example, the inner barrel 44 or the liner 48 of FIG. 2, or any other component configured with an acoustic panel in that environment. The second acoustic panel 10B may be configured as or otherwise included as part of, for example, the IFS component or the TR component of FIG. 2, or any other component configured with an acoustic panel in that environment.

Referring to FIGS. 3 and 4, the first acoustic panel 10A is configured with a perforated skin 12A, a non-perforated skin 14A and a cellular core 16A. These panel components 12A, 14A and 16A may be configured with a similar configuration as described above with respect to the acoustic panel 10 of FIG. 1, and therefore are not described below in further detail and are identified by the same identification numbers paired with the suffix "A". One or more or each perforation 18A in the perforated skin 12A of this first acoustic panel 10A has a first perforation size 54; e.g., a lateral width such as a diameter where the perforation 18A has a circular shape as shown in FIG. 3. Laterally adjacent perforations 18A in the perforated skin 12A of the first acoustic panel 10A are separated by an inter-perforation lateral first distance 56. This first distance 56 may be a distance between centers of the perforations 18A as shown in FIGS. 3 and 4, or a distance between outer perimeters of the perforations 18A. The perforated skin 12A of the first acoustic panel 10A has a vertical first thickness 58 (see FIG. 4), which is defined between the opposing surfaces 24A and 26A of the perforated skin 12A.

The second acoustic panel 10B is configured with a perforated skin 12B, a non-perforated skin 14B and a cellular core 16B. These panel components 12B, 14B and 16B may be configured with a similar configuration as described above with respect to the acoustic panel 10 of FIG. 1, and therefore are not described below in further detail and are identified by the same identification numbers paired with the suffix "B". One or more or each perforation 18B in the perforated skin 12B of this second acoustic panel 10B has a second perforation size 60; e.g., a lateral width such as a diameter where the perforation 18B has a circular shape as shown in FIG. 3. This second perforation size 60 is different, for example less, than the first perforation size 54. For example, the second perforation size 60 may be equal to or less than 0.02 inches (e.g., ≤0.015 inches) whereas the first perforation size 54 may be equal to or larger than 0.04 inches (e.g., ≥0.043 inches); however, the present disclosure is not limited to the foregoing exemplary relative sizes. Laterally adjacent perforations 18B in the perforated skin 12B of the second acoustic panel 10B are separated by an inter-perforation lateral second distance 62. This second distance 62 may be a distance between centers of the perforations 18B as shown in FIGS. 3 and 4, or a distance between outer perimeters of the perforations 18B. The second distance 62 may be different, for example less, than the first perforation size 54. For example, the second distance 62 may be equal to or larger than 0.04 inches (e.g., ≥0.042 inches) whereas the first distance 56 may be equal to or less than 0.15 inches (e.g., ≤0.12 inches); however, the present disclosure is not limited to the foregoing exemplary relative distances. The perforated skin 12B of the second acoustic panel 10B has a vertical second thickness 64 (see FIG. 4), which is defined between the opposing surfaces 24B and 26B of the perforated skin 12B. The second thickness 64 may be different, for example less, than the first thickness 58. For example, the second thickness 64 may be equal to or less than 0.025 inches (e.g., ≤0.023 inches) whereas the first thickness 58 may be equal to or greater than 0.03 inches (e.g., ≥0.035 inches); however, the present disclosure is not limited to the foregoing exemplary relative thicknesses. Alternatively, the first thickness 58 may be substantially (e.g., within +/−2%) or exactly equal to the second thickness 64, and the perforated skin 12B may have a ten percent (10%) higher structural strength (e.g., measured in KSI) than the perforated skin 12A. Of course, in other embodiments, the first and second thicknesses 58 and 64 as well as the structural strengths of the skins 12A and 12B may be different.

Referring to FIG. 3, with the above configurations, the perforated skin 12A of the first acoustic panel 10A has a first percentage of open area and the perforated skin 12B of the second acoustic panel 10B has a second percentage of open area that is different, for example less, than the first percentage of open area. For example, the second percentage of open area may be equal to or less than 7.5, whereas the first percentage of open area may be equal to or greater than 10; however, the present disclosure is not limited to the foregoing exemplary relative POAs.

In some embodiments, the first perforation size 54 may be substantially or exactly equal to or greater than 0.04 inches; e.g., ≥0.043 inches.

In some embodiments, the second perforation size 60 may be substantially or exactly equal to or less than 0.03 inches; e.g., ≤0.025 inches. In other embodiments, the second perforation size 60 may be substantially or exactly equal to or less than 0.02 inches; e.g., ≤0.015 inches.

In some embodiments, the first distance 56 may be substantially or exactly equal to or less than 0.15 inches; e.g., ≤0.12 inches.

In some embodiments, for example where the second acoustic panel 10B is configured with the thrust reverser, the second distance 62 may be substantially or exactly equal to or greater than 0.04 inches; e.g., ≥0.042 inches.

In some embodiments, the first thickness 58 may be substantially or exactly equal to or greater than 0.03 inches; e.g., ≥0.035 inches.

In some embodiments, for example where the second acoustic panel 10B is configured with the thrust reverser, the second thickness 64 may be substantially or exactly equal to or less than 0.025 inches; e.g., ≤0.023 inches.

In some embodiments, the first percentage of open area may be substantially or exactly equal to or greater than 7.5 percent; e.g., ≥10 percent.

In some embodiments, for example where the second acoustic panel 10B is configured with the thrust reverser, the first percentage of open area may be substantially or exactly equal to or less than 10 percent; e.g., ≤7.5 percent.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a first acoustic panel including a first perforated skin, a first non-perforated skin and a first cellular core with a first cavity dimension arranged between and connected to the first perforated skin and the first non-perforated skin, the first perforated skin configured with a plurality of first perforations and having a first percentage of open area, and a first of the first perforations having a first width; and a second acoustic panel including a second perforated skin, a second non-perforated skin and a second cellular core with a second cavity dimension arranged between and connected to the second perforated skin and the second non-perforated skin, the second perforated skin configured with a plurality of second perforations and having a second percentage of open area that is less than the first percentage of open area, a first of the second perforations having a second width that is smaller than the first width, and the second cavity dimension equal to the first cavity dimension.

2. The assembly of claim 1, wherein
each of the first perforations has the first width; and
each of the second perforations has the second width.

3. The assembly of claim 1, wherein
an adjacent pair of the first perforations is separated by a first distance; and
an adjacent pair of the second perforations is separated by a second distance that is greater than the first distance.

4. The assembly of claim 1, wherein
the first perforated skin has a first thickness; and
the second perforated skin has a second thickness that is less than the first thickness.

5. The assembly of claim 1, wherein
the first perforated skin has a first structural strength; and
the second perforated skin has a second structural strength that is greater than the first structural strength.

6. The assembly of claim 1, wherein the first percentage of open area is equal to or greater than 10, and the second percentage of open area is equal to or less than 7.5.

7. The assembly of claim 1, wherein the first acoustic panel is located forward of the second acoustic panel along an axial centerline of the aircraft propulsion system.

8. The assembly of claim 1, further comprising an inner barrel of a nacelle for the aircraft propulsion system, wherein the inner barrel comprises the first acoustic panel.

9. The assembly of claim 8, further comprising an inner fixed structure of a nacelle for the aircraft propulsion system, wherein the inner fixed structure comprises the second acoustic panel.

10. The assembly of claim 8, further comprising a thrust reverser of a nacelle for the aircraft propulsion system, wherein the thrust reverser comprises the second acoustic panel.

11. The assembly of claim 1, wherein the second width is at least substantially equal to or less than 0.025 inches.

12. The assembly of claim 1, wherein the second width is at least substantially equal to or less than 0.015 inches.

13. The assembly of claim 1, wherein the first width is at least substantially equal to or greater than 0.04 inches.

14. An assembly for an aircraft propulsion system, comprising: an acoustic panel including a perforated skin, a non-perforated skin and a cellular core arranged between and connected to the perforated skin and the non-perforated skin; the cellular core configured with a plurality of cavities; and the perforated skin configured with a plurality of perforations fluidly coupled with each of the cavities; wherein each of the perforations has a width that is at least substantially equal to or less than 0.03 inches.

15. The assembly of claim 14, wherein each of the perforations has a width that is at least substantially equal to or less than 0.02 inches.

16. The assembly of claim 14, wherein an adjacent pair of the perforations is separated by a distance at least substantially equal to or greater than 0.04 inches.

17. The assembly of claim 14, wherein the perforated skin is configured with a percentage of open area that is at least substantially equal to or less than ten.

18. The assembly of claim 14, further comprising a component of a nacelle for arranging aft of a fan section of the aircraft propulsion system, the component comprising the acoustic panel.

19. The assembly of claim 14, further comprising an inner fixed structure of a nacelle for the aircraft propulsion system, the inner fixed structure comprising the acoustic panel.

20. The assembly of claim 14, further comprising a thrust reverser for the aircraft propulsion system, the thrust reverser comprising the acoustic panel.

* * * * *